United States Patent
Al-Mulhem (10) Patent No.: US 10,974,972 B2
(45) Date of Patent: Apr. 13, 2021

(54) TREATMENT OF WATER COMPRISING DISSOLVED SOLIDS IN A WELLBORE

(71) Applicant: Saudi Arabian Oil Company, Dhahran (SA)

(72) Inventor: Abdulrahman Abdulaziz Al-Mulhem, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 53 days.

(21) Appl. No.: 16/298,477

(22) Filed: Mar. 11, 2019

(65) Prior Publication Data

US 2020/0290892 A1  Sep. 17, 2020

(51) Int. Cl.
*C02F 1/30* (2006.01)
*C02F 1/52* (2006.01)
*C02F 103/36* (2006.01)

(52) U.S. Cl.
CPC ............ *C02F 1/302* (2013.01); *C02F 1/52* (2013.01); *C02F 2103/365* (2013.01); *C02F 2301/066* (2013.01)

(58) Field of Classification Search
CPC .......... E21B 43/24; E21B 36/00; E21B 36/04; H05B 3/40; C02F 1/30; C02F 1/52
See application file for complete search history.

(56) References Cited

U.S. PATENT DOCUMENTS

| | | |
|---|---|---|
| 8,646,524 B2 | 2/2014 | Al-Buraik |
| 8,720,549 B2 | 5/2014 | Banerjee et al. |
| 9,341,050 B2 | 5/2016 | Al-Buraik |
| 10,337,306 B2 | 7/2019 | Batarseh |

(Continued)

FOREIGN PATENT DOCUMENTS

| | | |
|---|---|---|
| WO | 2012038814 A2 | 3/2012 |
| WO | 2014018696 A1 | 1/2014 |

(Continued)

OTHER PUBLICATIONS

International Search Report and Written Opinion dated May 25, 2020 pertaining to International application No. PCT/US2020/013815 filed Jan. 16, 2020, 18 pgs.

(Continued)

*Primary Examiner* — Cameron J Allen
(74) *Attorney, Agent, or Firm* — Dinsmore and Shohl LLP (57) ABSTRACT

Methods for treating water comprising dissolved solids in a wellbore include injecting water into a wellbore, where the wellbore has a depth that is sufficient for introducing a hydrostatic pressure that imparts supercritical pressure to water present at a water depth greater than or equal to the minimum depth needed to impart water supercritical pressure. A heating element is inserted into the wellbore to a heating element depth that is greater than or equal to the required depth. Power is transmitted to the heating element causing the heating element to heat water to a temperature sufficient to form supercritical water that causes the dissolved solids to precipitate out of the water as precipitated solids. Water and the precipitated solids are separated and extracted. The heating element includes a microwave antenna and a shell encapsulating the microwave antenna formed from a material that is capable of heating upon exposure to microwave radiation.

20 Claims, 3 Drawing Sheets

(56) References Cited

U.S. PATENT DOCUMENTS

| | | |
|---|---|---|
| 2003/0178191 A1 | 9/2003 | Maher et al. |
| 2005/0199386 A1 | 9/2005 | Kinzer |
| 2007/0137858 A1* | 6/2007 | Considine .......... E21B 43/2401 166/248 |
| 2007/0223999 A1 | 9/2007 | Curlett |
| 2007/0289736 A1 | 12/2007 | Kearl et al. |
| 2008/0265654 A1 | 10/2008 | Kearl et al. |
| 2009/0250204 A1 | 10/2009 | Harris |
| 2011/0005745 A1 | 1/2011 | Goodwin |
| 2011/0108491 A1 | 5/2011 | Lean et al. |
| 2012/0012319 A1 | 1/2012 | Dennis |
| 2014/0224491 A1 | 8/2014 | Segerstrom |
| 2015/0114646 A1 | 4/2015 | Hoelscher et al. |
| 2016/0053596 A1* | 2/2016 | Rey ................... E21B 43/2401 166/302 |
| 2016/0326839 A1 | 11/2016 | Ayub et al. |
| 2018/0363433 A1 | 12/2018 | Grounds, III et al. |

FOREIGN PATENT DOCUMENTS

| | | |
|---|---|---|
| WO | 2015009813 A2 | 1/2015 |
| WO | 2015038912 A1 | 3/2015 |
| WO | 2016179132 A1 | 11/2016 |
| WO | 2019032530 A1 | 2/2019 |

OTHER PUBLICATIONS

Chandrasekaran, "Microwave heating characteristics of graphite based powder mixtures", Article, 2013, 6 pgs, Internal Communications in Heat and Mass Transfer 48 (2013) 22-27, ScienceDirect.

Dastgheib, "An Integrated Supercritical System for Efficient Produced Water Treatment and Power Generation", Final Technical Report, 2015, 229 pgs.

Dunn, "Microwave Heating of Ceramics", Article, 2015, 8 pgs, Ceramic Industry.

Hodes, "Salt solubility and deposition in high temperature and pressure aqueous solutions", Article, 2004, 10 pgs, NIST.

Hovland, "Sub-surface precipitation of salts in supercritical seawater", Article, 2006, 10 pgs, Basin Research (2006) 18, 221-230.

Katsuki, "Novel Energy-Saving Materials for Microwave Heating", Article, 2008, 5 pgs, Chem. Mater. 2008, 20, 4803-4807, American Chemical Society.

Leusbrock, "Removal of inorganic compounds via supercritical water", Article, 2011, 43 pgs, University of Groningen.

Ripley, "Microwave and Process Technologies", Article, 2 pgs, National Security Complex.

Odu, "Design of a Process for Supercritical Water Desalination with Zero Liquid Discharge", Article, 2015, 9 pgs, Ind. Eng. Chem. Res. 2015, 54, 5527-5535, Industrial & Engineering Chemistry Research.

Odu, "Supercritical seawater desalination produces drinking water with zero liquid waste", Article, 2015, 3 pgs, Wetsus News.

Othman, "Combining Microwave and Activated Carbon for Oilfield Applications: Thermal-Electromagnetic Analysis of Activated Carbon", Article, 2017, 16 pgs, Society of Petroleum Engineers.

Schubert, "Continuous salt precipitation and separation from supercritical water. Part 2. Type 2 salts and mixtures of two salts", Article, 2010, 12 pgs, J. of Supercritical Fluids 52 (2010) 113-124, ScienceDirect.

Takahashi, "Supercritical water oxidation process utilizing salts contained in liquid waste as catalyst", Article, 2004, 9 pgs, WIT Press.

Xu, "Salt deposition problems in supercritical water oxidation", Article, 2015, 13 pgs, Chemical Engineering Journal 279 (2015) 1010-1022, ScienceDirect.

Zhao, "Visualisation of water flooding and subsequent supercritical $CO_2$ flooding in fractured porous media with permeability heterogeneity using MRI", Article, 2013, 8 pgs, Energy Procedia 37 (2013) 6942-6949, SciVerse ScienceDirect.

Zhao, "Experimental Investigation on Enhanced Oil Recovery of Extra Heavy Oil by Supercritical Water Flooding", Article, 2018, 8 pgs, Energy Fuels 2018, 32, 1685-1692, American Chemical Society.

International Search Report and Written Opinion dated Jul. 1, 2020 pertaining to International application No. PCT/US2020/021798 filed Mar. 10, 2020, 13 pgs.

U.S. Notice of Allowance and Fee(s) Due dated Aug. 26, 2020 pertaining to U.S. Appl. No. 16/352,217, filed Mar. 13, 2019, 23 pgs.

* cited by examiner

TREATMENT OF WATER COMPRISING DISSOLVED SOLIDS IN A WELLBORE

TECHNICAL FIELD

Embodiments of the present description generally relate to natural resource well drilling and, more specifically, to methods for using supercritical water in a natural resource well to improve treatment of water comprising dissolved solids in the wellbore.

BACKGROUND

In hydrocarbon production processes, produced water in oil and gas field operations is an issue that can hinder efficient oil production and recovery. Produced water is a byproduct of the hydrocarbon extraction process that is present with the oil and gas. The produced water therefore must be removed from the wellbore and the oil and gas must be separated from the produced water, which can add processing time and costs. Additionally, in many oil and gas production processes, the produced water can contain significant amounts of minerals and/or other dissolved solids (referred to in this description as total dissolved solids or "TDS"). The produced water can contain 200,000 parts per million (ppm) TDS. In some instances, one or more components of the TDS in the produced water may render the produced water unsuitable for reuse. Such components may include, depending on the geographical location of the wellbore, heavy metals or naturally occurring radioactive materials.

In addition to produced water, in some oil and gas field operations water or brine is introduced into the wellbore in a water flooding process. In such processes water is injected into the wellbore, such as to increase pressure within the wellbore and stimulate production of oil and gas. The water flooding process sweeps or displaces oil from the geological formation and into a producing wellbore, which increases production of oil and gas. The water used in the water flooding process can be produced water, or it can be water that is added into the wellbore, such as sea water, water from an aquifer, or water that has been transported from off-site. Like produced water, water added to the wellbore during the water flooding process must be removed from oil and gas as they are produced in a production well. This separation process can add processing time and costs. Additionally, during the water flooding process, the water used can absorb significant amounts of minerals and/or other TDS. In some instances, one or more components of the TDS in the water used for water flooding may render the water unsuitable for reuse. Such components may include, depending on the geographical location of the wellbore, heavy metals or naturally occurring radioactive materials.

SUMMARY

Accordingly, there is a need for production processes that can utilize one or both of produced water and water used in water flooding processes to improve the production of oil and gas during oil and gas field operations. In addition, there is a need for processes to efficiently extract one or both of produced water and water used in a water flooding processes from the wellbore while removing a portion of the TDS present in the produced water and water used during water flooding processes. Embodiments disclosed and described in this description converts the produced water or the water used in water flooding processes to supercritical water, which improves the production of oil and gas during oil and gas field operations while precipitating at least a portion of the TDS present in the produced water or water used in water flooding processes. Additionally, embodiments disclosed and described in this description provide a pathway for injecting water for extracting oil and gas and a separate pathway for extracting water from the well.

Embodiments of the present description are directed to methods for treating water comprising dissolved solids in a wellbore, the method comprising: injecting water into a wellbore, where the wellbore has a depth that is sufficient for introducing a hydrostatic pressure that imparts supercritical pressure to water present at the well vertical depth; inserting a heating element into the wellbore to a depth that is greater than or equal to the required depth; transmitting power to the heating element causing the heating element to heat water to a temperature sufficient to form supercritical water that causes the dissolved solids to precipitate out of the water as precipitated solids; separating the water and the precipitated solids; and extracting the water and the precipitated solids from the wellbore, where the heating element comprises a microwave antenna and a shell encapsulating the microwave antenna formed from a material that is capable of heating upon exposure to microwave radiation.

Some embodiments of the present description are directed to systems for treating water comprising dissolved solids in a wellbore comprising: a wellbore filled with water and having a depth that is sufficient for introducing a hydrostatic pressure that imparts supercritical pressure to water present at the true vertical depth; a power source positioned at a surface of the geological formation; a heating element present in the wellbore at a depth greater than or equal to the true vertical depth, where the heating element comprises a microwave antenna and a shell encapsulating the microwave antenna formed from a material that is capable of heating upon exposure to microwave radiation; a power wireline connecting the power source and the heating element, a separator that is capable of separating water and solids that have precipitated out of the water; and a demineralized water production well that is fluidly connected to the separator and provides an exit path for the water from the separator to an opening in the wellbore.

Additional features and advantages of the described embodiments will be set forth in the detailed description, which follows, and in part will be readily apparent to those skilled in the art from that description or recognized by practicing the described embodiments, including the detailed description, which follows as well as the claims and drawings.

DETAILED DESCRIPTION

In the present description, the following terms or units of measurement have been abbreviated, where:

TDS=total dissolved solids;
ppm=parts per million;
° C.=degrees Celsius;
g/mL=grams per milliliter;
OBM=oil-based mud;
psi=pounds per square inch;
ft.=foot or feet; and
psi/ft.=pounds per square inch per foot.

Embodiments of the present description are directed to methods for treating water comprising dissolved solids in a wellbore, the method comprising: injecting water into a wellbore, where the wellbore has a depth that is sufficient for introducing a hydrostatic pressure that imparts supercritical pressure to water present at a depth greater than or equal to the required depth; inserting a heating element into the wellbore to a depth that is greater than or equal to the required depth; transmitting power to the heating element causing the heating element to heat water to a temperature sufficient to form supercritical water that causes the dissolved solids to precipitate out of the water as precipitated solids; separating the water and the precipitated solids; and extracting the water and the precipitated solids from the wellbore, where the heating element comprises a microwave antenna and a shell encapsulating the microwave antenna formed from a material that is capable of heating upon exposure to microwave radiation.

Some embodiments of the present description are directed to systems for treating water comprising dissolved solids in a wellbore comprising: a wellbore filled with water and having a depth that is sufficient for introducing a hydrostatic pressure that imparts supercritical pressure to water present at a depth greater than or equal to the required depth; a power source positioned at a surface of the geological formation; a heating element present in the wellbore at a depth greater than or equal to the required depth, where the heating element comprises a microwave antenna and a shell encapsulating the microwave antenna formed from a material that is capable of heating upon exposure to microwave radiation; a power wireline connecting the power source and the heating element to a separator that is capable of separating water and solids that have precipitated out of the water; and a demineralized water production well that is fluidly connected to the separator and provides an exit path for the water from the separator to an opening in the wellbore.

A wellbore is a hole that extends from the surface to a location beneath the surface. The wellbore can permit access as a pathway between the surface and a hydrocarbon-bearing formation. The wellbore, defined and bound along its operative length by a wellbore wall, extends from a proximate end at the surface, through the subsurface, and into the hydrocarbon-bearing formation, where it traditionally terminates at a distal wellbore face. The wellbore forms a pathway capable of permitting both fluid and apparatus to traverse between the surface and the hydrocarbon-bearing formation. Besides defining the void volume of the wellbore, the wellbore wall also acts as the interface through which fluid can transition between the interior of the wellbore and the formations through which the wellbore traverses. The wellbore wall can be unlined (that is, bare rock or formation) to permit such interaction with the formation or lined (that is, with casing, tubing, production liner, or cement) so as not to permit such interactions.

The wellbore usually contains at least a portion of at least one tubular (that is, a fluid conduit) that links the interior of the wellbore to the surface. Examples of such fluid conduits or tubulars include casing, liners, pipes, tubes, coiled tubing and mechanical structures with interior voids. A fluid conduit connected to the surface is capable of permitting regulated fluid flow and access between equipment on the surface and the interior of the wellbore. Examples of equipment connected at the surface to the fluid conduit include pipelines, tanks, pumps, compressors, and flares. The fluid conduit is sometimes large enough to permit introduction and removal of mechanical devices—including tools, drill strings, sensors, and instruments—into and out of the interior of the wellbore.

The fluid conduit made from a tubular usually has at least two openings (typically on opposing ends) with an enclosing surface having an interior and exterior surface. The interior surface acts to define the bounds of the fluid conduit. Examples of tubulars and portions of tubulars used in the wellbore as fluid conduits or for making or extending fluid conduits include casing, production liners, coiled tubing, pipe segments and pipe strings. An assembly of several smaller tubulars connected to one another, such as joined pipe segments or casing, can form a tubular that acts as a fluid conduit.

When positioning a tubular or a portion of tubular in the wellbore, the volume between the exterior surfaces of the fluid conduit or tubular portion and the wellbore wall of the wellbore forms and defines a wellbore annulus. The wellbore annulus has a volume in between the external surface of the tubular or fluid conduit and the wellbore wall.

The wellbore contains wellbore fluid from the first moment of formation until completion and production. The wellbore fluid serves several purposes, including well control (hydraulic pressure against the fluids in the hydrocarbon-bearing formation), wellbore wall integrity (hydraulic pressure on the wellbore wall; provides loss control additives), and lubricity (operating machinery). Wellbore fluid is in fluid contact with all portions of the wellbore and everything in the wellbore that is not fluidly isolated, including the tubular internal fluid conduit, the wellbore annulus, and the wellbore wall. Other fluid conduits coupled to the wellbore often contain at least some wellbore fluid.

The produced water contains a significant concentration of TDS, such as around 200,000 ppm TDS, and some of the TDS can include solids that are environmentally hazardous or otherwise unsafe to dispose of. For example, produced water can include heavy metals—such as, for example, lithium, zinc, lead, manganese, iron, and barium—as components of the TDS. In other instances, the produced water may include naturally occurring radioactive materials. It can be difficult and costly to separate the TDS from the water to levels where it is acceptable to reuse the water, and it has become increasingly costly to store the produced water comprising TDS as it is commonly recognized as industrial waste and regulated by environmental and industrial safety organizations.

In addition to produced water, additional water may be introduced into the wellbore after drilling operations have been concluded (such as when the wellbore has reached the desired depth). In such instances, the drilling fluid may be replaced by injecting water into the wellbore. This process is referred to as water flooding. A principal reason for water flooding a wellbore is to increase the oil-production rate and, ultimately, the oil recovery. This is accomplished by injecting water to increase the reservoir pressure to its initial level and maintain it near that pressure. The water displaces oil from the pore spaces in the geological formation and pushes it towards a producing well, in a process referred to as "sweeping." Produced water as described previously in this description may be part of the water flooding process. In some instances, additional water (for example, water in addition to the produced water) is introduced into the wellbore during the water flooding process and may be water obtained from an aquifer, sea water, river water, or water brought from off-site.

However, water flooding has its limitations. The sweeping process improves oil and gas recovery, but it is not capable of extracting all of the oil and gas from the geological formation as water and oil are generally not miscible. In addition, the water introduced into the wellbore during the water flooding process will acquire minerals and other solids from the geological formation. Eventually, the water introduced into the wellbore during the water flooding process will have TDS contents that are similar to the TDS content of the produced water disclosed previously in this description. Therefore, water flooding processes can result in additional water (for example, water in addition to produced water) having TDS that must be separated from the water, treated, and stored in the same way as produced water. Embodiments disclosed and described in this description provide improved oil and gas extraction when compared to water flooding processes, and embodiments provide in-situ treatment of water containing large amounts of TDS by using supercritical water.

As used throughout this description, "supercritical water" refers to water at a pressure and a temperature greater than that of its critical pressure and temperature such that distinct phases do not exist, and the water may exhibit the diffusion of a gas while dissolving materials like a liquid. At a temperature and pressure greater than the critical temperature and pressure, the liquid and gas phase boundary of water disappears, and the fluid has characteristics of both liquid and gaseous substances. Supercritical water is able to dissolve organic compounds like an organic solvent, and has excellent diffusibility like a gas. Supercritical water generally has reduced density and is a nonpolar fluid as compared to liquid-phase sub-critical water thereby greatly extending the possible range of chemistry, which can be carried out in water. However, when the water that is to become supercritical water includes modifiers, such as the TDS present in the produced water and the post-waterflooding process water, is transformed into supercritical water, the dissolved and suspended solids will precipitate and fall out of suspension due to the phase conversion.

Supercritical water has various unexpected properties as it reaches supercritical boundaries. Supercritical water has very great solubility toward organic compounds and is miscible with hydrocarbons including oil and gas.

Moreover, the great temperature and great pressure of supercritical water may give water a density of 0.123 grams per milliliter (g/mL) at 3900 pounds per square inch (psi) and 450 degrees Celsius (° C.). Contrastingly, if the pressure was reduced to produce superheated steam, for example, at 2900 psi and 450° C., the steam would have a density of 0.079 g/mL. Fluids having a closer density to hydrocarbons may have better dissolution power. Additionally, at that density, the hydrocarbons may interact with superheated steam to evaporate and mix into the liquid phase, leaving behind a heavy fraction that may generate coke upon heating. Thus, when compared to sub-critical water or superheated steam, supercritical water is significantly better at extracting oil and gas from geological formations in part because it acts as a solvent for oil and liquid hydrocarbons and is infinitely miscible with gaseous hydrocarbons. In addition, as disclosed previously in this description, supercritical water including TDS becomes more nonpolar than liquid-phase sub-critical water, which will cause the dissolved solids to precipitate out of the supercritical water. In view of the benefits of supercritical water, embodiments disclosed and described in this description convert water in the wellbore, such as produced water and water used in water flooding processes, to supercritical water to further extract oil and gas from the geological formation (compared to sweeping processes with liquid-phase sub-critical water) and for in-situ removal of TDS from the water in the wellbore.

As disclosed previously in this description, in many instances water is present in the wellbore from oil and gas extraction processes either as produced water or as water added to the wellbore in water flooding processes. However, the water that is present in the wellbore is generally liquid-phase sub-critical water. To be converted to supercritical water, the liquid-phase sub-critical water present in the wellbore must be exposed to great temperature and great pressure.

Exposing the liquid-phase sub-critical water in the wellbore to great pressure will occur at certain wellbore depths. As is understood by a skilled artisan, the pressure head generated by the fluid filling the wellbore will increase as the depth of the wellbore increases. Accordingly, the liquid-phase sub-critical water present at large depths in the wellbore will be exposed to a pressure sufficient to convert this liquid-phase sub-critical water to supercritical water. As an example, water used in a water flooding process may have a gradient of 0.433 pounds per square inch per foot (psi/ft.). Thus, liquid-phase sub-critical water present in the wellbore at about 7500 feet (ft.) will be exposed to a pressure in excess of 3200 psi, which is sufficient to convert liquid-phase sub-critical water to supercritical water. Accordingly, water in the wellbore and present at large depths, such as depths greater than 7200 ft. from the surface, greater than 7250 ft. from the surface, greater than 7300 ft. from the surface, greater than 7350 ft. from the surface, greater than 7400 ft. from the surface, greater than 7450 ft. from the surface, or greater than 7500 ft. from the surface, will be exposed to pressures sufficient to convert liquid-phase sub-critical water to supercritical water. It should be understood that this depth depends on the gradient of the fluid being injected into the wellbore 100. According to embodiments, the gradient of the water injected into the wellbore is greater than 0.400 psi/ft., such as greater than 0.433 psi/ft., greater than 0.466 psi/ft., greater than 0.500 psi/ft., greater than 0.533 psi/ft., greater than 0.566 psi/ft., or greater than 0.600 psi/ft. The pressure that results from the hydrostatic pressure of the depth of the wellbore and the gradient of the water is, in embodiments, at the supercritical pressure, such as, greater than 3200 psi, greater than 3250 psi, greater than 3300 psi, greater than 3350 psi, greater than 3400 psi, greater than 3450 psi, greater than 3500 psi, greater than 3550 psi, greater than 3600 psi, greater than 3650 psi, or greater than 3700 psi. Even at these pressures, heating liquid-phase sub-critical water to temperatures necessary to convert the liquid-phase sub-critical water to supercritical water is difficult. However, embodiments of the present description address this issue.

Figure 1:
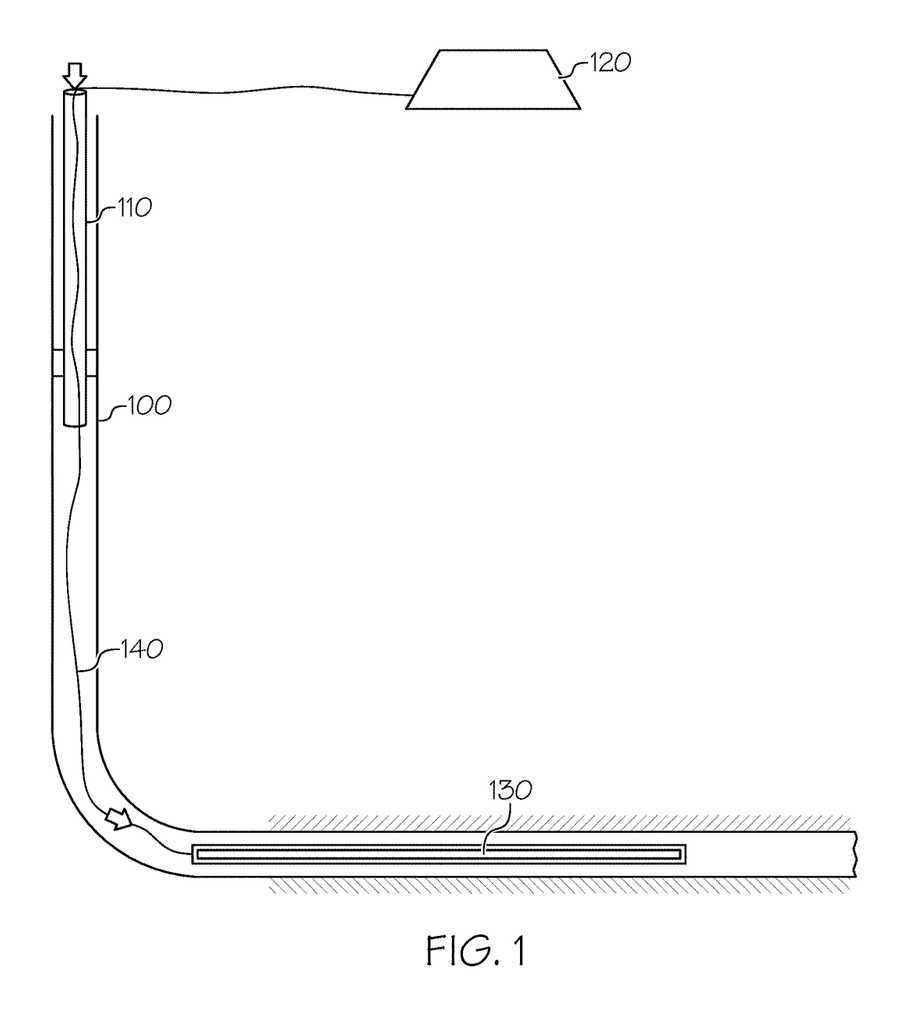
FIG. 1 schematically depicts an apparatus for heating water in a wellbore according to embodiments disclosed and described in this description.

With reference to FIG. 1, a system for providing supercritical temperature at great depths in a wellbore 100 is shown. A wellbore 100 for extracting oil and gas includes injection tubing 110 where, for example, drilling fluid and water may be introduced into the wellbore 100. The material from which the injection tubing 110 is made is any material commonly used as injection tubing 110 in oil and gas field operations. Introduced into the wellbore 100 through the injection tubing 110 is a device that, according to embodiments, is used to heat liquid-phase sub-critical water present at great depths of the wellbore 100. The device includes a power source 120 located at the surface of the geological formation and a heating element 130 functionally connected by a power wireline 140. The power source 120 of the device is not limited and may be any type of device that can generate energy, such as electrical energy. In embodiments, the power source 120 may be one or more solar power cells, one or more wind turbines, grid power, generator power, or a combination thereof. The power wireline 140 may, in embodiments, be any type of wireline that is capable of transmitting power from the power source 120 to the heating element 130. According to embodiments, the power wireline 140 may be coated with a material that is capable of protecting the power wireline 140 from the pressure, temperature, and materials present in the wellbore 100. In some embodiments, the power wireline may be coated with an electrically insulating and anti-corrosive material that prevents power from being transmitted from the power wireline 140 to the materials present in the wellbore 100, such as oil, gas, and water, while also preventing the power wireline 140 from being degraded by the materials present in the wellbore 100, which may cause the power wireline 140 to stop transmitting power from the power source 120 to the heating element.

Figure 2:
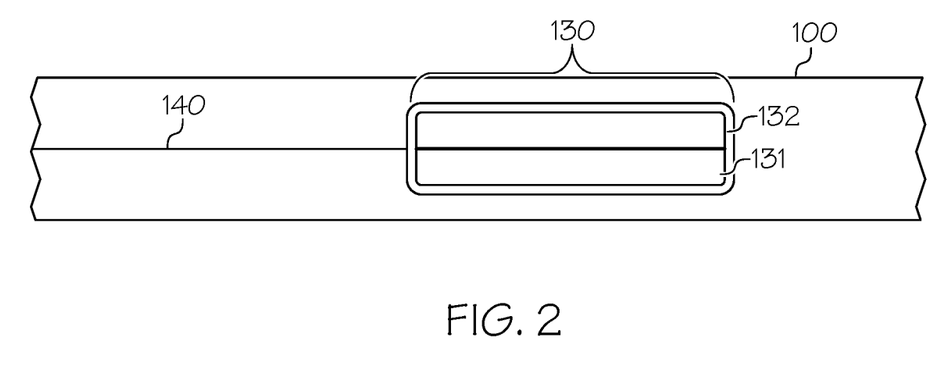
FIG. 2 schematically depicts a heating element comprising a microwave antenna encapsulated by a shell according to embodiments disclosed and described in this description.

The heating element 130 will now be described in more detail with reference to FIG. 2. The heating element 130, according to embodiments, comprises a microwave emitting antenna 131 encapsulated by a shell 132. The microwave antenna 131 may be any commercially available microwave antenna that is capable of operating at the pressure and temperature conditions present at great depths in the wellbore 100. The shell 132 that encapsulates the microwave antenna 131 is formed from a material that heats when exposed to microwave radiation and that is capable of withstanding the pressure and temperature at great depths of the wellbore 100. In addition, the material from which the shell 132 is made is, in embodiments, able to withstand chemical and physical corrosion when in contact with the materials present in the wellbore 100, such as oil, gas, and water having TDS. In some embodiments, the shell 132 may be made from ceramic materials, graphene materials, or activated carbon. In embodiments, the ceramic is zirconia, or alumina, silicon carbide, a mixture of silicon and silicon carbide, carbon or graphite, and molydisilicide, which all heat up to increased temperatures upon absorption of microwave radiation. The power wireline 140 is electrically connected to the microwave antenna 131 so that the power wireline 140 supplies the microwave antenna 131 with power.

When power is transmitted from the power wireline 140 to the microwave antenna 131, the microwave antenna 131 emits microwave radiation that heats the shell 132 to temperatures greater than 500° C., such as greater than 550° C., greater than 600° C., greater than 650° C., greater than 700° C., greater than 750° C., greater than 800° C., greater than 850° C., greater than 900° C., greater than 950° C. or greater than 1000° C. In embodiments, the microwave antenna 131 emits microwave radiation that heats the shell 132 to temperatures that are less than 1700° C., less than 1650° C., less than 1600° C., less than 1550° C., less than 1500° C., less than 1450° C., less than 1400° C., less than 1350° C., less than 1300° C., less than 1250° C., or less than 1200° C. In some embodiments the microwave antenna 131 emits microwave radiation that heats the shell 132 to temperatures of about 950° C., about 1000° C., or about 1050° C. By heating the shell 132 to such temperatures, the water within the wellbore 100 near the heating element will be heated to a temperature greater than the temperature required to convert liquid-phase sub-critical water to supercritical water, such as heating the water to temperatures greater than 375° C., greater than 400° C., greater than 425° C., greater than 450° C., greater than 475° C., or greater than 500° C.

According to embodiments, water is present in the wellbore 100 in which the heating element 130 is inserted, and the heating element 130 is inserted into the wellbore 100 to a depth where the water is exposed to supercritical pressures sufficient to convert liquid-phase sub-critical water to supercritical water, such as depths greater than 7200 ft. Therefore, the heating element provides temperatures sufficient to convert liquid-phase sub-critical water to supercritical water at such depths within the wellbore 100. According to embodiments, power is transmitted to the microwave antenna 131 by the power wireline 140 only when the heating element 130 is at the target depth within the wellbore. For example, if the microwave antenna 131 is provided with power by the power wireline 140 before the heating element 130 reaches the target depth, the heating element 130 may heat liquid-phase sub-critical water that is not at the appropriate pressure to convert to supercritical water, which will produce steam within the wellbore 100. If steam is produced upstream in the wellbore 100, the pressure within the wellbore 100 may drop such that pressures required to convert liquid-phase sub-critical water to supercritical water is not reached even at depths greater than 7500 ft., for example. It should be understood that the liquid-phase sub-critical water is converted to supercritical water during oil extraction, and there is no soak period (such as a period where extraction is paused) with the supercritical water.

In view of previous disclosure of this description, embodiments include a method for recovering at least one of oil and gas from a geological formation comprising: injecting water into a wellbore, where the wellbore has a depth that is sufficient for introducing a hydrostatic pressure that imparts supercritical pressure to water present at a depth greater than or equal to the required depth; inserting a heating element into the wellbore to a depth that is greater than or equal to the required depth to provide the needed hydrostatic pressure; transmitting power to the heating element causing the heating element to heat water to a temperature sufficient to form supercritical water that will turn into a nonpolar fluid precipitating all its dissolved solids, where the heating element comprises a microwave antenna and a shell encapsulating the microwave antenna formed from a material that is capable of heating upon exposure to microwave radiation.

By using the methods and apparatuses of embodiments previously disclosed in this description, oil and gas may be more efficiently extracted from geological formations. This improved efficiency is accomplished because supercritical water is more efficient at extracting oil and gas from geological formations than liquid-phase sub-critical water. However, introducing water into the wellbore to create the hydrostatic pressure required to convert liquid-phase sub-critical to supercritical water may also create more water with significant TDS that needs to be treated or removed. Accordingly, embodiments disclosed and described in this disclosure provide processes for removal of TDS from water in-situ of the wellbore.

Figure 3:
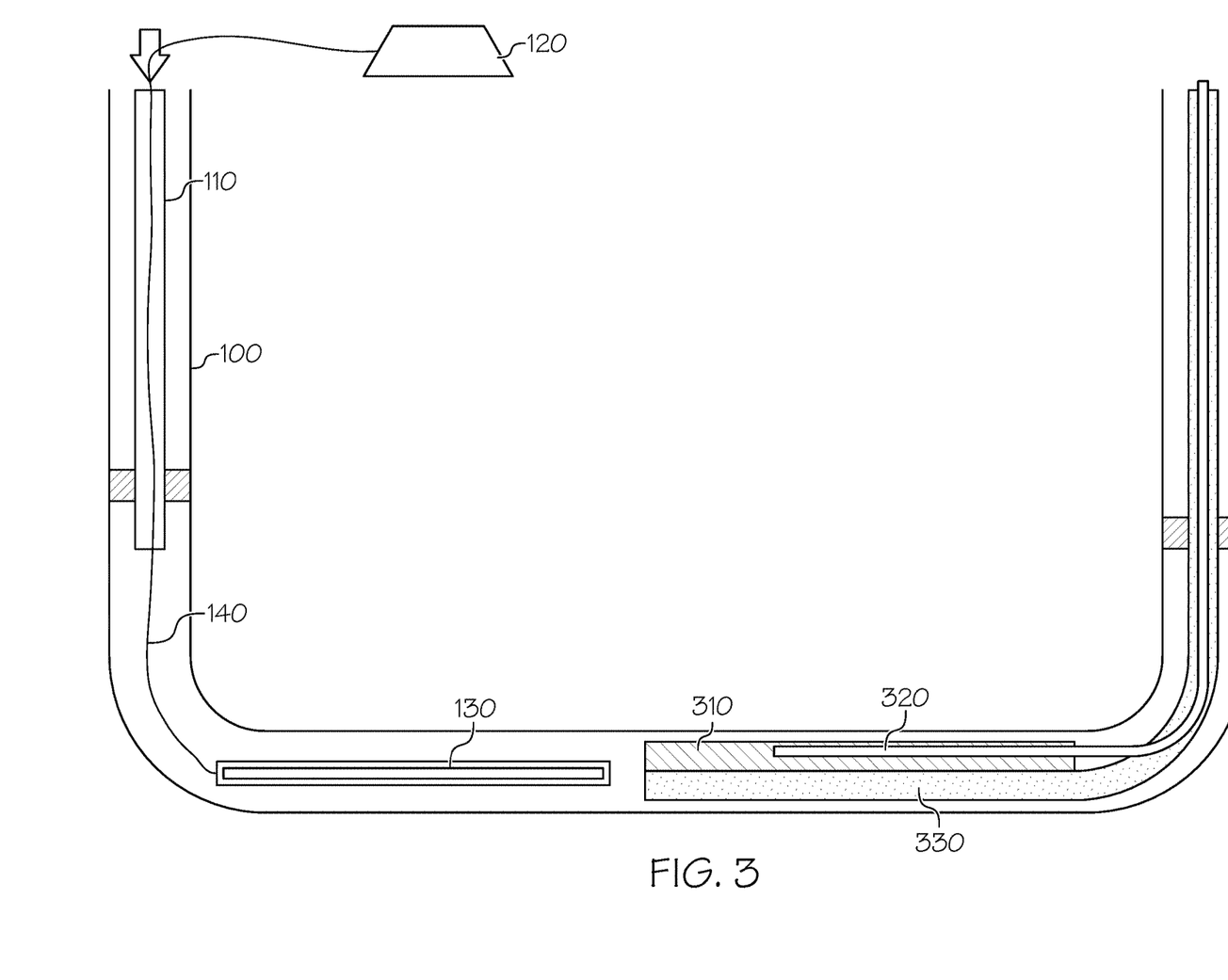
FIG. 3 schematically depicts a system for in-situ treatment of supercritical water having significant concentrations of TDS.

With reference now to FIG. 3, systems for removing TDS from water within the wellbore are described in detail. Similar to the apparatus described with reference to FIG. 1, systems for removing TDS from water in-situ of the wellbore comprise a wellbore 100, injection tubing 110, a power source 120, a heating element 130, and a power wireline 140 connecting the power source 120 and the heating element 130. In embodiments, the wellbore 100 is a U-shaped wellbore 100 comprising an entry point where the injection tubing 110 enters the wellbore 100 and an exit point where a demineralized water production well 320 and an increased mineral concentration slurry 330 exits through the annulus of the wellbore 100. The heating element 130 is introduced into the wellbore 100 to a depth where the hydrostatic pressure is sufficient to provide supercritical pressure to the water present at that depth. Once the heating element is at the required depth or deeper, power is transmitted from the power source 120 to the heating element 130 by the power wireline 140. As power is received by the heating element 130 it is heated to temperature sufficient to heat the water to a supercritical temperature, as described previously in this description. Once the liquid-phase sub-critical water reaches the supercritical temperature, such as temperatures greater than 350° C., it is converted into supercritical water. Accordingly, supercritical water comprising TDS is present in the wellbore 100 at or near the heating element 130. According to embodiments, the separator is placed at a depth where the water is at supercritical conditions. At these supercritical conditions, the water will be a nonpolar fluid that precipitates the dissolved solids, which will then need to be separated from the demineralized water.

As disclosed previously in this description, without being bound by theory, although supercritical water generally has lesser polarity than liquid-phase sub-critical water, the polarity of supercritical water comprising significant amounts of TDS is lost turning into a nonpolar fluid as the water is converted from liquid-phase sub-critical water to supercritical water. The loss of polarity of the supercritical water comprising significant amounts of TDS causes the various TDS to precipitate out of the supercritical water.

To capitalize from the previously described phenomena that separates the solids of the TDS precipitated from the supercritical water, a separator 310 may be placed in the wellbore 100 near the heating element 130. The separator 310 separates the demineralized water from the solids of the TDS precipitated from the supercritical water into a demineralized water stream and a slurry comprising the solids of the TDS precipitated from the supercritical water. The demineralized water exits the wellbore 100 through the demineralized water production well 320, which is fluidly connected to the separator 310 and provides an exit for the demineralized water from the wellbore, and the increased mineral concentration slurry 330 exits the wellbore 100 through the annulus. Because the increased mineral concentration slurry 330 comprises corrosive materials, such as heavy metals, the wellbore 100 should be made of materials that are capable of withstanding the corrosive nature of the increased mineral concentration slurry 330. Accordingly, in embodiments, super alloys, such as Inconel™ or Hastelloy™, are materials which can resist corrosion. The separator 310 not only needs to be capable of separating the demineralized water from the solids of the TDS precipitated from the supercritical water, but must also be capable of operating at the pressure and temperature of the supercritical water within the wellbore 100.

The demineralized water that exits the demineralized water production well 320 can be used in many uses in the oil and gas production fields such as, for example, for use as a fracturing fluid, reintroduced into the wellbore 100 to be converted into supercritical water. The increased mineral concentration slurry 330 that exits the wellbore 100 through the annulus may, in embodiments, be collected and further processed to extract valuable materials. For example, the increased mineral concentration slurry 330 may contain lithium, uranium, or mixtures thereof that may be extracted from the increased mineral content slurry 330 and used in other processes. The valuable materials may be extracted from the increased mineral concentration slurry 330 by any known separation processes.

A first aspect includes a method for treating water comprising dissolved solids in a wellbore, the method comprising: injecting water into a wellbore, where the wellbore has a depth that is sufficient for introducing a hydrostatic pressure that imparts supercritical pressure to water present at a water depth greater than or equal to the required depth; inserting a heating element into the wellbore to a heating element depth that is greater than or equal to the required depth; transmitting power to the heating element causing the heating element to heat water to a temperature sufficient to form supercritical water that causes the dissolved solids to precipitate out of the water as precipitated solids; separating the water and the precipitated solids; and extracting the water and the precipitated solids from the wellbore, where the heating element comprises a microwave antenna and a shell encapsulating the microwave antenna formed from a material that is capable of heating upon exposure to microwave radiation.

A second aspect includes the method for treating water comprising dissolved solids in a wellbore of the first aspect, where the wellbore is a U-shaped wellbore comprising a first opening where water is injected into the wellbore and comprising a second opening where water and the precipitated solids are removed from the wellbore.

A third aspect includes the method for treating water comprising dissolved solids in a wellbore of any one of the first or second aspects, where separating the water and the precipitated solids comprises transmitting the water to a demineralized water production well.

A fourth aspect includes the method for treating water comprising dissolved solids in a wellbore of the third aspect, where extracting the water and the precipitated solids from the wellbore comprises extracting water from the second opening of the wellbore through the demineralized water production well, and extracting the precipitated solids from the second opening of the wellbore through the annulus of the wellbore.

A fifth aspect includes the method for treating water comprising dissolved solids in a wellbore of the fourth aspect, where the annulus of the second opening of the wellbore is constructed of non-corrosive materials.

A sixth aspect includes the method for treating water comprising dissolved solids in a wellbore of any one of the first to fifth aspects, where the depth is greater than 7200 ft. from a surface of the geological formation.

A seventh aspect includes the method for treating water comprising dissolved solids in a wellbore of any one of the first to sixth aspects, where the water has a gradient of greater than 0.400 psi/ft.

An eighth aspect includes the method for treating water comprising dissolved solids in a wellbore of any one of the first to seventh aspects, where the supercritical pressure is greater than 3200 psi.

A ninth aspects includes the method for treating water comprising dissolved solids in a wellbore of the first to eighth aspects, where the temperature sufficient to form supercritical water is greater than 350° C.

A tenth aspect includes the method for treating water comprising dissolved solids in a wellbore of any one of the first to ninth aspects, where the shell of the heating element is heated to a temperature that is greater than 500° C.

An eleventh aspect includes a system for treating water comprising dissolved solids in a wellbore comprising: a wellbore filled with water and having a depth that is sufficient for introducing a hydrostatic pressure that imparts supercritical pressure to water present at a water depth greater than or equal to the required depth; a power source positioned at a surface of the geological formation; a heating element present in the wellbore at a heating elements depth greater than or equal to the required depth, where the heating element comprises a microwave antenna and a shell encapsulating the microwave antenna formed from a material that is capable of heating upon exposure to microwave radiation; a power wireline connecting the power source and the heating element a separator that is capable of separating water and solids that have precipitated out of the water; and a demineralized water production well that is fluidly connected to the separator and provides an exit path for the water from the separator to an opening in the wellbore.

A twelfth aspect includes the system for treating water comprising dissolved solids in a wellbore of the eleventh aspect, where the wellbore is a U-shaped wellbore comprising a first opening where water is injected into the wellbore and comprising a second opening where water and the precipitated solids are removed from the wellbore.

A thirteenth aspect includes the system for treating water comprising dissolved solids in a wellbore of the twelfth aspect, where the second opening of the wellbore is configured to extract precipitated solids from the wellbore through an annulus.

A fourteenth aspect includes the system for treating water comprising dissolved solids in a wellbore of the thirteenth aspect, where the annulus of the second opening of the wellbore is constructed of non-corrosive materials.

A fifteenth aspect includes the system for treating water comprising dissolved solids in a wellbore of any one of the eleventh to fourteenth aspects, where the depth is greater than 7200 ft. from the surface.

A sixteenth aspect includes the system for treating water comprising dissolved solids in a wellbore of any one of the eleventh to fifteenth aspects, where the power source is solar power cells, one or more wind turbines, grid power, generator power, or a combination thereof.

A seventeenth aspect includes the system for treating water comprising dissolved solids in a wellbore of any one of the eleventh to sixteenth aspects, where the shell encapsulating the microwave antenna is made from ceramic materials, graphene materials, or activated carbon.

An eighteenth aspect includes the system for treating water comprising dissolved solids in a wellbore of any one of the eleventh to seventeenth aspects, where the shell encapsulating the microwave antenna is made from zirconia.

A nineteenth aspect includes the system for treating water comprising dissolved solids in a wellbore of any one of the eleventh to eighteenth aspects, where the shell of the heating element is heated to a temperature that is greater than 500° C.

A twentieth aspect includes the system for treating water comprising dissolved solids in a wellbore of any one of claims eleven to nineteen, where the shell of the heating element is heated to a temperature that is greater than 1000° C.

Having described the subject matter of the present description in detail and by reference to specific embodiments, it is noted that the various details described in this description should not be taken to imply that these details relate to elements that are essential components of the various embodiments described in this description, even in cases where a particular element is illustrated in each of the drawings that accompany the present description. Rather, the claims infra should be taken as the sole representation of the breadth of the present description and the corresponding scope of the various embodiments described in this description. Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the claims recited infra and their equivalents.

It should be understood that any two quantitative values assigned to a property may constitute a range of that property, and all combinations of ranges formed from all stated quantitative values of a given property are contemplated in this description. It should be appreciated that compositional ranges of a chemical constituent in a composition or formulation should be appreciated as containing, in some embodiments, a mixture of isomers of that constituent. It should be appreciated that the examples supply compositional ranges for various compositions, and that the total amount of isomers of a particular chemical composition can constitute a range.

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Where a range of values is provided in the Specification or in the appended Claims, it is understood that the interval encompasses each intervening value between the maximum value and the minimum value as well as the maximum value and the minimum value. The invention encompasses and bounds smaller ranges of the interval subject to any specific exclusion provided. As used in this description, the word "about" followed by a number includes the stated number plus or minus two significant digits.

What is claimed is:

1. A method for treating water comprising dissolved solids in a wellbore, the method comprising:
    injecting water into a wellbore, where the wellbore has a depth that is greater than or equal to a required depth, wherein the required depth is a depth that is sufficient for introducing a hydrostatic pressure that imparts supercritical pressure to water present at the required depth;
    inserting a heating element into the wellbore to a heating element depth that is greater than or equal to the required depth;
    transmitting power to the heating element causing the heating element to heat water to a temperature sufficient to form supercritical water that causes the dissolved solids to precipitate out of the water as precipitated solids;
    separating the water and the precipitated solids; and
    extracting the water and the precipitated solids from the wellbore, where
    the heating element comprises a microwave antenna and a shell encapsulating the microwave antenna formed from a material that is capable of heating upon exposure to microwave radiation.

2. The method for treating water comprising dissolved solids in a wellbore of claim 1, where the wellbore is a U-shaped wellbore comprising a first opening where water is injected into the wellbore and comprising a second opening where water and the precipitated solids are removed from the wellbore.

3. The method for treating water comprising dissolved solids in a wellbore of claim 2, where separating the water and the precipitated solids comprises transmitting the water to a demineralized water production well.

4. The method for treating water comprising dissolved solids in a wellbore of claim 3, where extracting the water and the precipitated solids from the wellbore comprises extracting water from the second opening of the wellbore through the demineralized water production well, and
   extracting the precipitated solids from the second opening of the wellbore through an annulus of the wellbore.

5. The method for treating water comprising dissolved solids in a wellbore of claim 4, where the annulus of the second opening of the wellbore is constructed of non-corrosive materials.

6. The method for treating water comprising dissolved solids in a wellbore of claim 1, where the depth is greater than 7200 ft. from a surface of a geological formation.

7. The method for treating water comprising dissolved solids in a wellbore of claim 1, where the water has a gradient of greater than 0.400 psi/ft.

8. The method for treating water comprising dissolved solids in a wellbore of claim 1, where the supercritical pressure is greater than 3200 psi.

9. The method for treating water comprising dissolved solids in a wellbore of claim 1, where the temperature sufficient to form supercritical water is greater than 350° C.

10. The method for treating water comprising dissolved solids in a wellbore of claim 1, where the shell of the heating element is heated to a temperature that is greater than 500° C.

11. A system for treating water comprising dissolved solids in a wellbore comprising:
   a wellbore filled with water and having a depth that is greater than or equal to a required depth, wherein the required depth is a depth that is sufficient for introducing a hydrostatic pressure that imparts supercritical pressure to water present at the required depth;
   a power source positioned at a surface of a geological formation;
   a heating element present in the wellbore at a heating element depth greater than or equal to the required depth, where the heating element comprises a microwave antenna and a shell encapsulating the microwave antenna formed from a material that is capable of heating upon exposure to microwave radiation;
   a power wireline connecting the power source and the heating element
   a separator that is capable of separating water and solids that have precipitated out of the water; and
   a demineralized water production well that is fluidly connected to the separator and provides an exit path for the water from the separator to an opening in the wellbore.

12. The system for treating water comprising dissolved solids in a wellbore of claim 11, where the wellbore is a U-shaped wellbore comprising a first opening where water is injected into the wellbore and comprising a second opening where water and the precipitated solids are removed from the wellbore.

13. The system for treating water comprising dissolved solids in a wellbore of claim 12, where the second opening of the wellbore is configured to extract precipitated solids from the wellbore through an annulus.

14. The system for treating water comprising dissolved solids in a wellbore of claim 13, where the annulus of the second opening of the wellbore is constructed of non-corrosive materials.

15. The system for treating water comprising dissolved solids in a wellbore of claim 11, where the depth is greater than 7200 ft. from the surface.

16. The system for treating water comprising dissolved solids in a wellbore of claim 11, where the power source is solar power cells, one or more wind turbines, grid power, generator power, or a combination thereof.

17. The system for treating water comprising dissolved solids in a wellbore of claim 11, where the shell encapsulating the microwave antenna is made from ceramic materials, graphene materials, or activated carbon.

18. The system for treating water comprising dissolved solids in a wellbore of claim 11, where the shell encapsulating the microwave antenna is made from zirconia.

19. The system for treating water comprising dissolved solids in a wellbore of claim 11, where the shell of the heating element is heated to a temperature that is greater than 500° C.

20. The system for treating water comprising dissolved solids in a wellbore of claim 11, where the shell of the heating element is heated to a temperature that is greater than 1000° C.

* * * * *